Nov. 22, 1955  R. A. HOLLOWAY  2,724,782
PHASE SEQUENCE CORRECTING CIRCUIT
Filed April 15, 1953
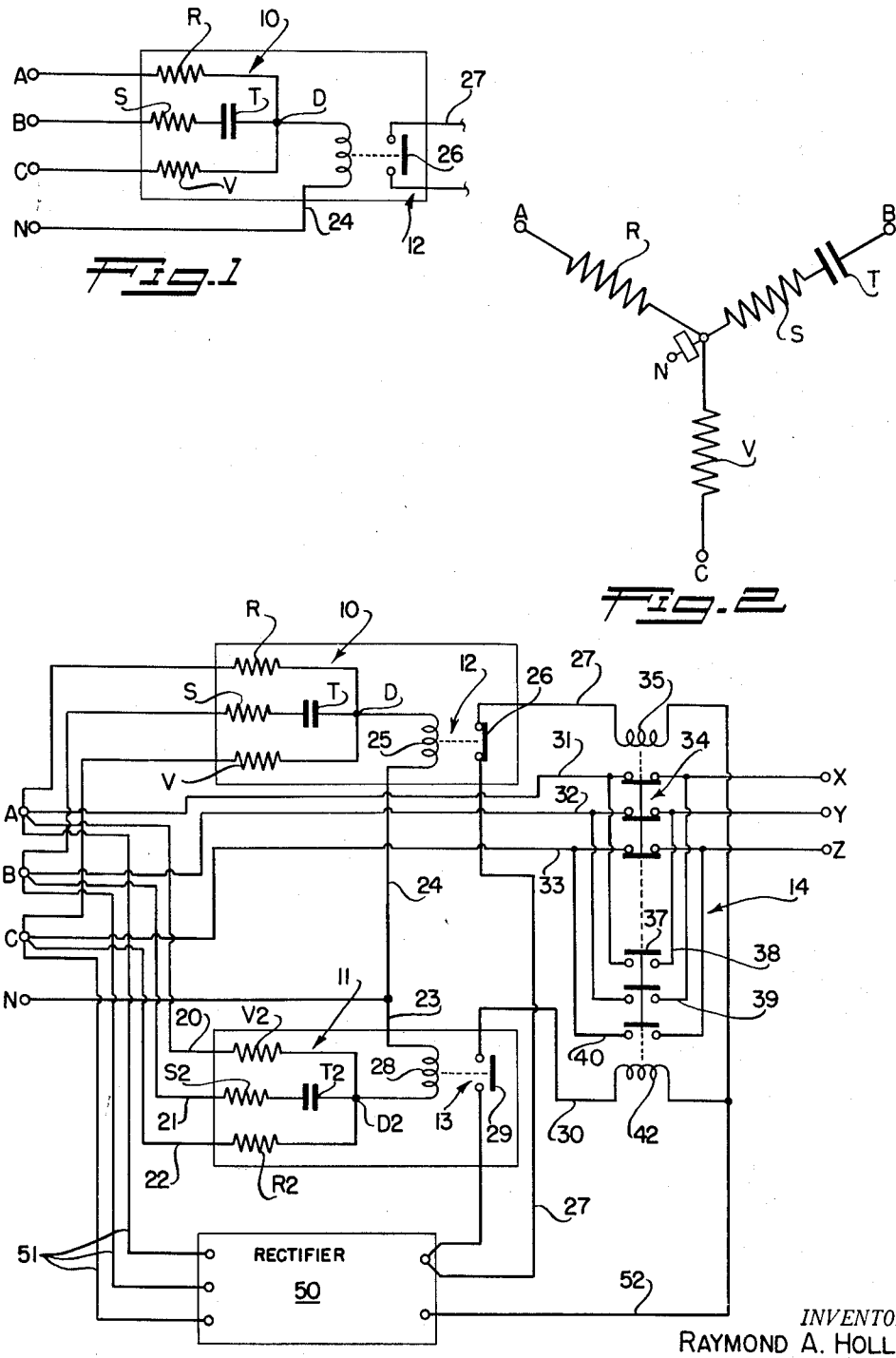
INVENTOR.
RAYMOND A. HOLLOWAY
BY
George C. Sullivan
Agent United States Patent Office 2,724,782
Patented Nov. 22, 1955

2,724,782

PHASE SEQUENCE CORRECTING CIRCUIT

Raymond A. Holloway, North Hollywood, Calif., assignor to Lockheed Aircraft Corporation, Burbank, Calif.

Application April 15, 1953, Serial No. 348,892

9 Claims. (Cl. 307—127)

This invention relates, generally, to three-phase electrical systems and relates more particularly to circuits or devices for correcting reversed or negative phase sequence conditions of a three-phase A. C. system.

In three-phase circuits, as employed in certain aircraft and elsewhere, it is important that the positive phase sequence, that is the intended or designed phase sequence be maintained at all times. For example, in the event the phase sequence of such a system is reversed or made negative for any reason whatsoever, the direction of rotation of the various motors energized by the system will be reversed because the direction of rotation of poly-phase motors is determined by the time sequence of the voltages applied to the motor phase windings. In aircraft electrical systems such accidental reversal of rotation of the motors may well have very serious consequences. The phase sequence of such a three-phase system may be accidentally reversed in the operation of double throw or interlocking contactors by the inadvertent reversal of the power source as by incorrectly connecting a motor alternator at the input side and in various other ways.

Certain devices and circuits have been introduced for indicating reversed or negative phase sequence but are merely in the nature of indicators producing insufficient current change to actuate a relay or other device. Further, such prior circuits will function properly on only a very narrow band of frequencies. There has also been introduced a phase sequence responsive device that is basically a three-phase torque motor provided with a spring restrained rotor which serves to operate or close contacts upon a given angular displacement depending upon phase sequence. This torque motor type of device is heavy, expensive to operate and generates considerable heat.

It is an object of this invention to provide a phase sequence correcting device or circuit for use with a three-phase A. C. system that automatically operates to maintain a preselected or positive phase sequence at its output terminals irrespective of the phase sequence of the voltages applied at its input terminals. The device of the present invention is such that the preselected phase sequence, herein usually referred to as the positive phase sequence, will appear at the output terminals when voltages of either a positive or a negative phase sequence are applied to the input terminals and thus protects the system and the devices and components energized and controlled thereby from injury and malfunctioning as a result of negative or reversed phase sequence.

Another object of the invention is to provide a phase sequence correcting device of this kind that operates satisfactorily over a wide range of applied frequencies, at a substantial range of line to neutral voltages, and that is substantially unaffected by voltage unbalance between the phases or by substantial temperature variations. These capabilities or characteristics of the device particularly well suit it for aircraft installations.

Another object of the invention is to provide a phase sequence correcting device that serves to disconnect the output terminals from the input or source when no voltage is applied at the input terminals. This action or feature further serves to protect the system and its several components.

It is a further object of the invention to provide a phase sequence correcting device that is light in weight, relatively inexpensive to manufacture and operate and that is eminently dependable in operation, developing or applying sufficient current change to positively actuate its reversing contactor or switch device in the event of phase sequence reversal or change.

Other objectives and features of the invention will become apparent from the following detailed description of a typical preferred embodiment, throughout which description reference will be made to the accompanying drawings wherein:

Figure 1 is a wiring diagram of one of the phase sequence sensitive networks of the invention and its associated relay;

Figure 2 is a schematic diagram of the circuit or network illustrated in Figure 1; and Figure 3 is a wiring diagram of the phase sequence correcting device or circuit of the invention.

The device or circuit of the invention, as illustrated in the drawings, may be said to comprise, generally, two phase sequence sensitive networks 10 and 11, relays 12 and 13 controlled or operated thereby and a reversing contactor or switch device 14 controlled in turn by the relays 12 and 13.

The input terminals are designated A, B and C and the particular three-phase system in this case has a neutral terminal N. In case there is no system neutral, an artificial neutral may be provided as will be readily apparent to those skilled in the art. The output terminals of the device are designated X, Y and Z, the device or circuit of the invention being interposed between the input terminals A, B and C and the output terminals X, Y and Z and serving to apply positive phase voltages to the terminals X, Y and Z, irrespective of the phase sequence of the voltages applied to the input terminals A, B and C. The abovementioned network 10 has a common junction D and three branches or legs AD, BD, and CD, and a line 24 extends from the junction D to the neutral terminal N. The relay 12 is operatively interposed in this line 24.

As seen in Figure 2 the legs AD, BD and CD of the network are connected in star relation. The network 10 includes a resistance V in the leg CD and a condenser T in the leg BD. It is preferred to provide a capacitor in the leg BD rather than an inductive reactance because of the lesser cost and weight although an inductive reactance may be used if desired. The currents in the branches or legs AD and CD are in phase with the voltages of the legs AD and CD and the current in the branch or leg BD leads the voltage of the leg BD by an angle determined by the ratio of the resistance of resistor S to the reactance of the condenser T. The currents in legs AD and CD are determined by the values of their respective resistors and the corresponding voltages which are substantially constant. The values of the resistors R and V are so chosen for the particular intended operating frequency and phase sequence that the vector sum of their currents is equal to and opposite to the current in leg BD. Thus under what will be considered normal, "positive" or unreversed phase sequence operating conditions there is little or no current flow to neutral, D to N. Because the phase position and magnitude of the current in the resistance-capacitance series circuit are not changed greatly even with wide variations in frequency, such variations result in only a small current flow to neutral. The relay 12 is so chosen or constructed as not to respond to this small amount of current. Thus the network 10 is substantially insensitive to frequency variations. When for any reason the phase sequence of circuits A, B, C is reversed, the relationships between the voltages and currents in the legs of the network are changed and the currents add up vectorially to produce a different sum or total. The total of the current in legs AD and CD is as before but their sum, as represented in a vector diagram, and the current in BD are no longer 180° out of phase and although they may be equal their sum is a value which is substantial and far from zero. Thus there is the passage of substantial current from D to N for the energization of relay 12 when the phase sequence of the circuit A, B, C, is reversed or made negative. At the normal line frequency this current is three or more times as great as the current sent to the neutral when one phase sequence is normal or unreversed and when the frequency is any value from one-half to twice the normal value.

The relative values of the resistors R, S and V and the related value of the condenser T assure or effect the above described operation of the network. The resistors R, S and V are of such magnitude of resistance as to pass the amount of current required for the given or chosen relay 12 and these resistances are approximately in such ratios as to cause the vector relations to exist as described above. The resistance of the resistor S is such that when it is connected to a voltage equal to the line to neutral voltage of the three-phase system for which the network 10 is designed, a current will flow through it equal to the current which the network is required to deliver to the relay 12 when the phase sequence is negative and the frequency is of the normal or designed value. The resistance of the resistor V should theoretically be 1.26 times the resistance of the resistor S; the resistance of the resistor R should theoretically be 4.71 times the resistance of the resistor S and the capacitance of the capacitor T or the inductance of the inductor, if one is employed instead of the capacitor, should theoretically be such as to produce a resistance equal in numerical value to the resistance of the resistor S when the frequency is approximately the normal or design value. If the device is to be used at various frequencies over a range then the frequency described herein as normal is the geometric mean of the highest and lowest frequencies included in the range of desired operation.

In practice the numerical values of the resistors R, S and V and the capacitor T may differ from the theoretical values for various reasons. For example, it may be necessary to adapt the circuit or device to an A. C. voltage wave containing harmonics or the device may be required to operate over an extreme range of temperature where it is necessary to use resistors and a capacitor having values satisfactory over such a temperature range. Again the resistors and capacitor may preferably be of commercially available ratings or values and other practical considerations may well influence the numerical values of the resistors and capacitors actually incorporated in the circuit. Thus from a theoretical standpoint the resistance in ohms of the resistors S, V and R would be 15,000, 19,000 and 71,000 respectively and the capacitor T would have a rating of 0.020 micro-farad assuming the network is employed in connection with a 120 volt, 520 cycle, three-phase system and is to energize an 8 ma. load relay 12, whereas in actual aircraft installation associated with a 120 volt, 520 cycle, poly-phase system for energizing an 8 ma. relay the resistance in ohms in the resistors S, V and R may be 15,000, 20,000 and 80,000 respectively and the capacitance of the capacitor T may be 0.019 micro-farad. The ratios and magnitudes of the resistors S and V and the capacitor T may be varied from the given theoretical values so as to eliminate the necessity for the branch containing the resistor R if a slightly impaired performance can be tolerated. This may be a satisfactory arrangement for applications in which the variations in frequency or ambient temperatures are less extreme than those found in aircraft applications. In the case where the network is used with a 120 volt, 520 cycle supply to energize an 8 ma. relay, the theoretical values in ohms of the resistors S and V will be 13,000 and 26,000 respectively and the series capacitance of the network branch containing the capacitor T will be 0.0136 micro-farad. In the event an inductance is used instead of a capacitance the network 10 will deliver current to the relay 12 when the phase sequence is opposite to that which causes the network to deliver current, that is A, C, D.

From the foregoing it will be seen that when the phase sequence of the line voltages is normal or positive the network 10 delivers little or no current to neutral N but when the phase sequence is reversed or negative the network delivers a very appreciable current to neutral. This current is utilized to magnetize or energize the relay 12.

The voltages of a three-phase electrical system can only be in either of two sequences and either sequence can be considered "positive" and the other will then be negative. Thus the networks of the invention can be arranged or constructed to deliver current to the neutral with either phase sequence by exchanging the electrical positions of the two resistors which are not in the branch containing the capacitor T.

Referring now to the network 11 it will be seen to be similar to the network 10, having three resistors $V^2$, $S^2$ and $R^2$, a condenser $T^2$ and a common junction $D^2$. In this network 11 the resistor $V^2$ is connected with the line A by a lead 20, the resistor $S^2$ is connected with the line B by a lead 21 and resistor $R^2$ is connected with line C by a lead 22, the condenser $T^2$ being connected between resistor $S^2$ and the junction $D^2$. The network 11, which is provided to control or operate the relay 13 has a line 23 extending from the junction $D^2$ to the neutral N and the winding 28 of the relay 13 is connected in this line. The relay 12, which is controlled by the network 10 is similarly connected in a line 24 extending from the junction D to neutral. Assuming that the relay 13 is similar to or of the same value as the relay 12, the values of the resistors $R^2$, $S^2$ and $V^2$ will be the same as those of the corresponding resistors R, S and V of the network 10 and the condenser $T^2$ will be the same as condenser T. Accordingly, if the network 10 is considered as operable to supply energizing current to relay 12 when the phase sequence of the input voltages from lines A, B and C is positive, the network 11 is operable to supply energizing current to the relay 13 when the phase sequence of the input voltages is "negative" or reversed. Relays 12 and 13 are semi-sensitive in that the differential between pull-in and drop-out operating voltages is relatively small.

The relay 12 includes the coil or winding 25 connected in the abovementioned line 24 and a contactor 26 actuated thereby and controlling a line or circuit 27. The relay 13 has a coil 28 connected in the above described line 23 and a contactor 29 adapted to be actuated by the coil and controlling a circuit 30. A suitable three-phase rectifier 50 of any appropriate or selected type has connections or leads 51 extending from the input terminals A, B and C and the rectifier supplies direct current to the circuits 27 and 30 controlled by the relays 12 and 13, as just described. A common or return line 52 extends from the circuits 27 and 30 back to the rectifier 50.

The reversing contactor or switch device 14 is connected between lines 31, 32 and 33, extending from the three-phase input terminals A, B and C respectively, and the output or load terminals X, Y and Z. The switch 14 includes a gang contactor 34 movable into and out of engagement with terminals on the related or corresponding lines 31, 32 and 33 and X, Y and Z. This contactor 34 is operated by a coil or magnetic winding 35 interposed in the above described circuit 27 which, in turn, is controlled by the contactor 26 of the relay 12. The reversing switch 14 further includes a gang contactor 37 movable into and out of engagement with terminals in connections or lines 38, 39 and 40. The line 38, when completed by the contactor 37 connects the input line 31 with the output line or terminal X, the line 39 when completed by the contactor 37 connects the input line 32 with the output line Y and the line 40 when completed by the contactor 37 connects the input line 33 with the output terminal Z. The contactor 37 is operated by a coil or winding 42 in the above described circuit 30 which, in turn, is controlled by the contactor 29 of the relay 13. The contactors 26 and 29 of the relays 12 and 13 are preferably spring biased to open positions to remain clear of their respective terminals or contacts until their respective relays 12 and 13 are energized and the gang contactors 34 and 37 of the switch device 14 are also preferably of the normally open type to remain clear of their respective terminals until actuated by their respective coils 35 and 42. It is preferred that the gang contactors 34 and 37 be mechanically interlocked as illustrated so that either one or the other, but not both, may be closed at any one time. Accordingly, when no voltage is applied by the input terminals A, B and C, the output terminals X, Y and Z are disconnected from the input.

While I have shown main contactors to be D. C. operated, these may be A. C. operated directly from networks 10 and 11 without the aid of rectifier 50 or relays 12 and 13 by the expedient of increasing the power output of networks 10 and 11.

It is believed that the operation of the phase sequence reversing device or circuit described above will be readily understood. With the input terminals A, B and C supplying voltages of one phase sequence, let us say, a "negative" phase sequence, the network 10 supplies actuating current to the coil 25 of the relay 12 to close the contactor 26 which, in turn, results in energization of the coil 35 to actuate the gang contactor 34. So long as the winding 35 remains magnetized or energized the output leads X, Y and Z are connected respectively with the lines 31, 32 and 33, that is with the input terminals A, B and C. In the event of a reversal of the phase sequence of the voltages applied at the terminals A, B and C, the network 10 no longer supplies actuating current to the relay 12 but the network 11 now supplies energizing current to the coil 28 of the relay 13 to close the contactor 29. This in turn energizes the winding 42 of the reversing switch 14 to actuate the gang contactor 37. The contactor 37 operates to connect the lines 32, 31 and 33 respectively and, therefore, the input lines B, A and C respectively with the output terminals X, Y and Z and thus causes voltages of the same sequence to appear at the output terminals as was the case when the so-called "negative" sequence voltages were applied at the input terminals A, B and C. Therefore, with the device or circuit of the invention voltages of a preselected or designed sequence will always be obtained at or applied to the output terminals X, Y and Z, regardless of the sequence of the voltages applied at the input terminals A, B and C. It will also be observed that when no voltage is applied at the input terminals A, B and C, the output terminals X, Y and Z are disconnected from the input. These actions or features of the invention dependably protect all of the circuits, motors and other instrumentalities connected with the output terminals X, Y and Z against damage or injury as a result of inadvertent or accidental reversal of the sequence of the applied voltages and against results of interruption of the supply voltages.

Having described only typical forms of the invention I do not wish to be limited to the specific details herein set forth, but wish to reserve to myself any variations or modifications that may appear to those skilled in the art and fall within the scope of the following claims.

I claim:

1. A device for use with a three-phase electrical system comprising first, second and third input terminals and first, second and third load terminals, a reversing switch device connected between the input and load terminals and having a first position where it connects the first, second and third input terminals with the first, second and third load terminals respectively, and a second position where it connects the second, first and third input terminals with the first, second and third load terminals respectively, a first relay means for causing actuation of the switch device to said first position, a second relay means for causing actuation of the switch device to said second position, a first resistance-capacitance network connected with the input terminals and the first relay means operable to supply energizing current to the first relay means when the voltages at the input terminals are in one phase sequence, and a second resistance-capacitance network connected with the input terminals and the second relay means operable to supply energizing current to the second relay means when the voltages at the input terminals are in the other phase sequence.

2. A device for use with a three-phase electrical system comprising first, second and third input terminals and first, second and third load terminals, a reversing switch device connected between the input and load terminals and having a first position where it connects the first, second and third input terminals with the first, second and third load terminals respectively, and a second position where it connects the second, first and third input terminals with the first, second and third load terminals respectively, a first relay means for causing actuation of the switch device to said first position, a second relay means for causing actuation of the switch device to said second position, a first network connected with the input terminals and the first relay means operable to supply energizing current to the first relay means when the voltages at the input terminals are in one phase sequence, and a second network connected with the input terminals and the second relay means operable to supply energizing current to the second relay means when the voltages at the input terminals are in the other phase sequence, each of said networks comprising a leg connected with each input terminal, one leg including a resistance and a capacitance connected in series, the other legs each including a resistance and a common junction connecting the three legs and connected with the respective relay means and delivering thereto a current of a magnitude that is dependent upon the sequence of said voltages.

3. A device for use with a three-phase electrical system comprising first, second and third input terminals and first, second and third load terminals, a reversing switch device connected between the input and load terminals and including a first contactor operable to connect the first, second and third input terminals with the first, second and third load terminals respectively, and a second contactor operable to connect the second, first and third input terminals with the first, second and third load terminals respectively, a circuit controlling each contactor and including a relay, a first resistance-capacitance network connected with the input terminals and including a junction connected with the relay of one circuit operable to supply energizing current thereto only when the voltages at the input terminals are in one-phase sequence, and a second resistance-capacitance network connected with the input terminals and including a junction connected with the relay of the other circuit to supply energizing current thereto only when the voltages at the input terminals are in the other phase sequence, energization of one relay causing actuation of one contactor and energization of the other relay causing actuation of the other contactor.

4. A device for use with a three-phase electrical system comprising first, second and third input terminals and first, second and third load terminals, a reversing switch device connected between the input and load terminals and including a first contactor operable to connect the first, second and third input terminals with the first, second and third load terminals respectively, and a second contactor operable to connect the second, first and third input terminals with the first, second and third load terminals respectively, a circuit controlling each contactor and including a relay, a first network connected with the input terminals and including a junction connected with the relay of one circuit operable to supply energizing current thereto only when the voltages at the input terminals are in one-phase sequence, and a second network connected with the input terminals and including a junction connected with the relay of the other circuit to supply energizing current thereto only when the voltages at the input terminals are in the other phase sequence, energization of one relay causing actuation of one contactor and energization of the other relay causing actuation of the other contactor, each network including a leg connected with each input terminal and with said junction, one of said legs including a resistor and a capacitor connected in series, the second leg including a resistor having a resistance approximately 1.26 times the resistance of the first named resistor, the third leg including a resistor having a resistance approximately 4.7 times the resistance of said first named resistor.

5. A device for use with a three-phase electrical system comprising first, second and third input terminals and first, second and third load terminals, a reversing switch device connected between the input and load terminals and including a first contactor operable to connect the first, second and third input terminals with the first, second and third load terminals respectively, and a second contactor operable to connect the second, first and third input terminals with the first, second and third load terminals respectively, means interconnecting the contactors to the end that either one or the other but not both can be closed at any one time, a circuit controlling each contactor and including a relay, a first resistance-capacitance network connected with the input terminals and including a junction connected with the relay of one circuit operable to supply energizing current thereto only when the voltages at the input terminals are in one-phase sequence and a second resistance-capacitance network connected with the input terminals and including a junction connected with the relay of the other circuit to supply energizing current thereto only when the voltages at the input terminals are in the other phase sequence, energization of one relay causing actuation of one contactor and energization of the other relay causing actuation of the other contactor.

6. A device for use with a three-phase electrical system comprising first, second and third input terminals and first, second and third load terminals, a reversing switch device connected between the input and load terminals and including a first contactor operable to connect the first, second and third input terminals with the first, second and third load terminals respectively, and a second contactor operable to connect the second, first and third input terminals with the first, second and third load terminals respectively, a circuit controlling each contactor and including a relay, a first network connected with the input terminals and including a junction connected with the relay of one circuit operable to supply energizing current thereto only when the voltages at the input terminals are in one-phase sequence and a second network connected with the input terminals and including a junction connected with the relay of the other circuit to supply energizing current thereto only when the voltages at the input terminals are in the other phase sequence, energization of one relay causing actuation of one contactor and energization of the other relay causing actuation of the other contactor, each network including a leg connected with each input terminal and with said junction, one of said legs including a resistor and a capacitor connected in series, the second leg including a resistor having a resistance approximately 1.26 times the resistance of the first named resistor, the third leg including a resistor having a resistance approximately 4.7 times the resistance of said first named resistor, the said second leg of the first network being connected with the third input terminal, said third leg of the first network being connected with the first input terminal, the second leg of the second network being connected with the first input terminal and said third leg of the second network being connected with the third input terminal.

7. A device for use with a three-phase electrical system comprising first, second and third input terminals and first, second and third load terminals, a reversing switch device connected between the input and load terminals and including a first contactor operable to connect the first, second and third input terminals with the first, second and third load terminals respectively, and a second contactor operable to connect the second, first and third input terminals with the first, second and third load terminals respectively, a circuit controlling each contactor and including a relay, rectifier means connected with the input terminals and supplying direct current to said circuit, a first resistance-capacitance network connected with the input terminals and including a junction connected with the relay of one circuit operable to supply energizing current thereto only when the voltages at the input terminals are in one-phase sequence and a second resistance-capacitance network connected with the input terminals and including a junction connected with the relay of the other circuit to supply energizing current thereto only when the voltages at the input terminals are in the other phase sequence, energization of one relay causing actuation of one contactor and energization of the other relay causing actuation of the other contactor.

8. A device for use with a three-phase electrical system comprising first, second and third input terminals and first, second and third load terminals, a reversing switch device connected between the input and load terminals and having a first position where it connects the first, second and third input terminals with the first, second and third load terminals respectively, and a second position where it connects the second, first and third input terminals with the first, second and third load terminals respectively, said switch device including a first coil for actuating said device to its first position, and a second coil for actuating said device to its second position, a first resistance-capacitance network connected with the input terminals operable to supply current to cause energization of said first coil when the voltages at said input terminals are in one-phase sequence and a second resistance-capacitance network connected with the input terminals operable to supply current to cause energization of said second coil when the voltages at said input terminals are in the other phase sequence.

9. A device for use with a three-phase electrical system comprising first, second and third input terminals and first, second and third load terminals, a reversing switch device connected between the input and load terminals and having a first position where it connects the first, second and third input terminals with the first, second and third load terminals respectively, and a second position where it connects the second, first and third input terminals with the first, second and third load terminals respectively, said switch device including a first coil for actuating said device to its first position, and a second coil for actuating said device to its second position, a first resistor-condenser network connected with the input terminals operable to supply current to cause energization of said first coil when the voltages at said input terminals are in one-phase sequence and a second resistor-condenser network connected with the input terminals operable to supply current to cause energization of said second coil when the voltages at said input terminals are in the other phase sequence.

References Cited in the file of this patent

UNITED STATES PATENTS 1,753,383    McDonald _____ Apr. 8, 1930